C. R. DAVIS.
DRAFT ATTACHMENT.
APPLICATION FILED MAR. 25, 1918.
1,289,407.
Patented Dec. 31, 1918.
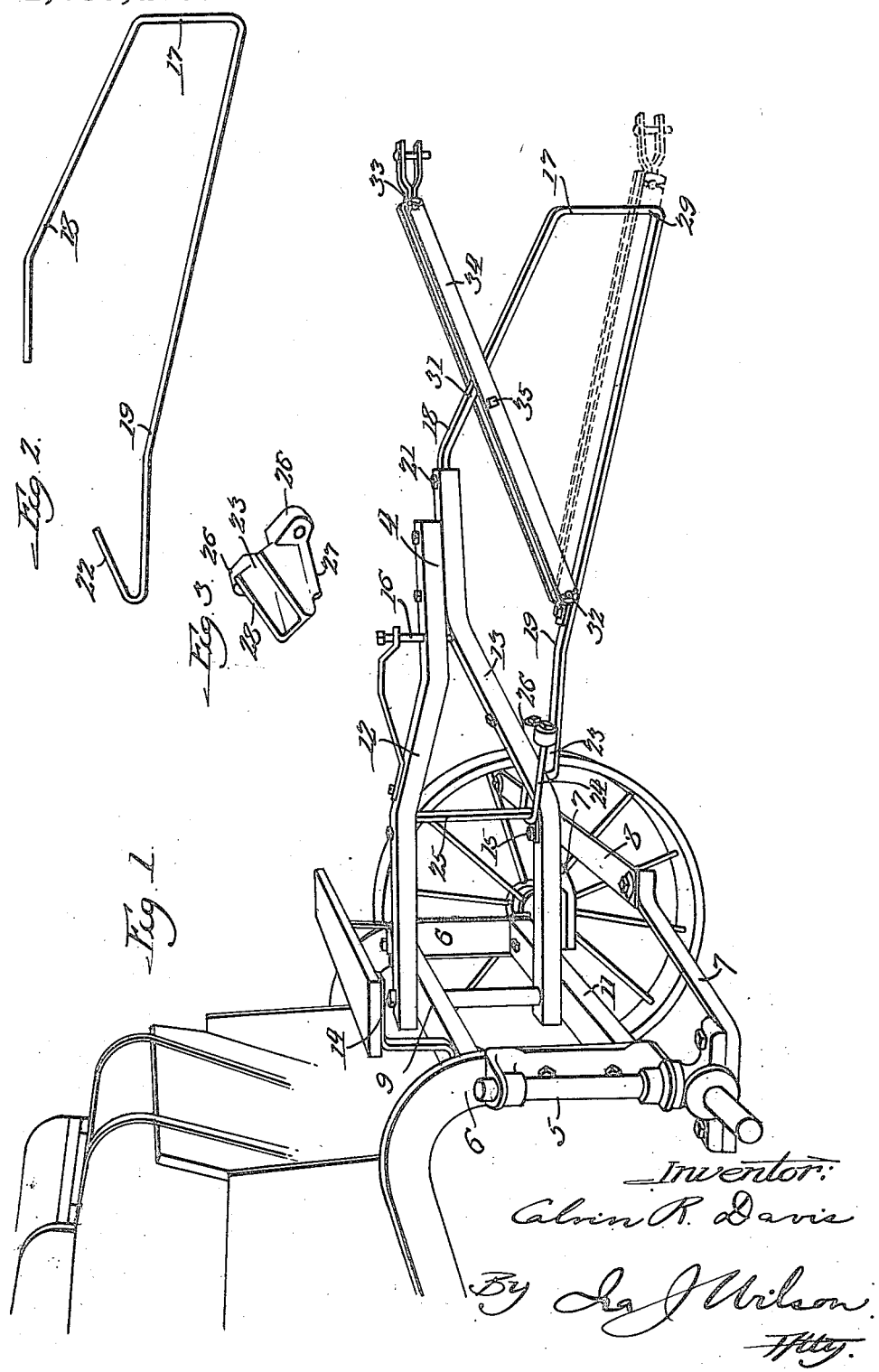

UNITED STATES PATENT OFFICE.

CALVIN R. DAVIS, OF ROCKFORD, ILLINOIS, ASSIGNOR TO EMERSON-BRANTINGHAM COMPANY, OF ROCKFORD, ILLINOIS, A CORPORATION OF ILLINOIS.

DRAFT ATTACHMENT.

1,289,407.  Specification of Letters Patent.  Patented Dec. 31, 1918.

Application filed March 25, 1918. Serial No. 224,483.

*To all whom it may concern:*

Be it known that I, CALVIN R. DAVIS, a citizen of the United States, residing at Rockford, in the county of Winnebago and State of Illinois, have invented certain new and useful Improvements in Draft Attachments, of which the following is a specification.

This invention relates to draft attachments for connecting a trailing vehicle or farm implement to a traction engine, and has more particular reference to what might be termed a draft bar attachment for connection to a tractor, a vehicle or implement having a laterally swingable stub tongue, various usages of which are well known. One example, however, of such a stub tongue, is illustrated and described in my co-pending application, Serial No. 90,482, as applied to a manure spreader.

It is desired to attach such a stub tongue to a tractor or the like through the agency of a detachable draft bar constructed to enable quick and easy attachment under varying conditions and to serve practically and satisfactorily as an effectual draft medium.

In the present invention I have aimed, primarily, to provide an improved draft attachment for the purpose mentioned, by means of which a trailing vehicle having a stub tongue may be quickly and easily connected to a tractor regardless of variations in the height of the tractor draw-bar from the ground, and whereby provision is made for flexibility in the connection to take care of relative movement between the tractor and trailing vehicle when passing over undulatory ground, ruts, etc., and at the same time provide proper rigidity of the draft members with respect to lateral displacement so that the drawn vehicle will trail in proper alinement with the tractor.

I have also aimed to provide a draft attachment constructed of very few parts and in such simple manner that it may be produced at a comparatively low cost and at the same time will be amply strong and durable for any and all conditions and exigencies of service.

Referring to the drawings,—

Figure 1 is a perspective view of a draft attachment embodying my improvements attached to the stub tongue of a manure spreader of the character mentioned above;

Fig. 2, a side elevation of the stationary element alone, of the draft attachment;

Fig. 3, a perspective view of a casting employed in connecting the stationary element to the stub tongue.

While I have shown my improvements in connection with a stub tongue of the character described in my application mentioned above, it should be understood that this is simply for the purpose of illustration only, for they are applicable as will be presently understood, to various forms of stub tongues or similar hitch elements. In order to fully understand the present showing, a brief description is herein given of the stub tongue structure. The stub tongue designated in general by reference character 4, is connected with front wheels of the autopivot type as distinguished from the usual pivot axle or fifth wheel. In this case the wheel knuckles 5 are pivotally mounted upon the downturned portions 6 of the wagon sills and are connected and held in parallel relation by forwardly extending arms 7 and the connecting bar 8. Upper and lower cross bars 9 and 11 respectively fixedly secured to the upright portions 6 of the sills serve to brace and tie the latter together in a substantial manner. The stub tongue 4 consists of upper and lower channel iron sections 12 and 13 fixedly secured together at their forward ends and diverging rearwardly and resting respectively on the top of the cross bars 9 and 11 to which they are pivotally connected through the agency of a bolt 14. By pivotally connecting the stub tongues to the cross rod 8 at 15, the stub tongue is held in parallel relation with the front wheels and the latter will be angled in unison with the tongue. A suitable evener or other hitch may be attached at 16, and the main pole, not shown, may be suitably connected to the stub tongue either in direct alinement therewith or in laterally offset relation thereto for either a two or three horse hitch, as the case may be. When it is desired to draw the vehicle behind a tractor, the main pole is removed and an engine hitch or draft attachment is applied to the stub tongue in the manner now to be described.

My improved draft attachment consists, generally stated, of a sectional draft bar, one part of which is fixedly and detachably connectible to the stub tongue so as to form a fixed forward extension thereof, and the other a movable draft bar element pivotally connected at its rear end to the fixed part so as to be capable of free vertical swinging movement at its forward end and adapted at this end for attachment to a tractor. The pivoted part is slidably associated intermediate its ends with the fixed part so as to be held in alinement therewith, and consequently, in alinement with the stub tongue and in parallel relation with the dirigible wheels. It is desired that the attachment shall be so constructed that it may be quickly and easily connected to the stub tongue, that the attachment may be conveniently connected to the draw bar of a tractor regardless of differences in the height of the latter from the ground, that the connection shall be flexible vertically when passing over uneven ground, that while providing for such flexibility the attachment shall be literally an extension of the stub tongue which will swing laterally with the same in parallel relation with the wheels so that the vehicle will trail behind the tractor in proper alinement therewith.

In the present embodiment of my improvements the stationary part of the sectional draft bar is formed of a metal bar designated in general by character 17, bent medially to a general U-shape to provide spaced upper and lower arms 18 and 19 respectively, adapted to be fixedly connected to the stub tongue. As shown, the arm 18 fits within the forward end of the channel bar 13 and is secured thereto by a bolt 21, and the arm 19 is bent back upon itself providing a hooked end 22 adapted to be received in and conforming to, the inclined portion of the channel bar 13. This hooked end 22 is clamped to the bar 13 by means of a block 23 and a U-bolt 24, the latter of which passes around and anchors upon an upright brace rod 25 between the bars 12 and 13 of the stub tongue and has threaded ends passing loosely through bolt holes in the laterally projecting ears 26 of the clamping block. As shown in Fig. 3, the clamping block is provided on its underside with depending flanges 27, fittingly engaging the sides of the bar 19, and the inclined walls 28 of the block bear against the inclined end 22 of the rod 19 so that when the nuts on the U-bolt are drawn tight the block, and consequently the hooked end of the bar 17, will be clamped in a wedging engagement with the member 13 of the stub tongue so as to fixedly secure these parts together. While this latter connection enables the draft attachment to be quickly and easily connected to or removed from the stub tongue, it also serves as the medium through which the draft is transmitted and provides a very practical connection for the purpose. It will be noted that the forward portion of the fixed part of the draft attachment is inclined downwardly so as to provide, together with the upright forward end of the fixed part, a vertical guide for a purpose presently to be mentioned, extending substantially from the points 29 to 31. The other part of the sectional draft bar pivoted at 32 to the fixed part 17, embraces the guide portion of the fixed part so as to be held against lateral displacement with respect thereto, and is adapted for attachment at its front end 33 to the draw bar of a tractor or the like. This pivoted part is in the form of a pair of spaced bars 34 between which the forward portion of the fixed part is interposed so as to constitute a guide for maintaining the pivoted part in longitudinal alinement therewith. By reason of this construction the pivoted part 34 of the sectional draft bar or attachment is free to swing from an elevated position such as is indicated in full lines in Fig. 1, to a lowered position indicated in dotted lines, these positions being limited by contact of a stop bolt 35 on the part 34 against the upper and lower arms 18 and 19 respectively of the fixed part. As a consequence, the draft bar part 34 may be immediately attached to any draw bar irrespective of variations in its height from the ground, as all draw bars are positioned well within the limits afforded by the present construction. Referring to Fig. 1, it might be here mentioned that although at first glance the lower forward end of the draft attachment appears to be quite close to the ground, it is in fact, in this construction about 14 inches above the ground. This is due simply because the view is in perspective and the near front wheel is removed, which gives the draft attachment the appearance of being closer to the ground than it really is. It will be noted that when the draft attachment is pivotally connected at its forward end to a tractor, the stub tongue and draft attachment is, in effect, a rigid construction as regards lateral movement, and at the same time provides adequate flexibility by reason of the pivotal movement of the draft bar part 34 as is necessarily required in usage. It will be understood that in the use of stub tongues or the like constructed different from that shown in the drawing herein, the fixed part of the draft attachment would be suitably constructed for attachment to such stub tongue.

It is believed that the foregoing conveys a clear understanding of my improvements, and while I have illustrated but one working embodiment it will be understood that the structural elements are susceptible of considerable change in size, shape and proportions without departing from the spirit and scope of the invention as expressed in the appended claims, in which I claim:

1. Draft means for vehicles, comprising a laterally swingable stub tongue and a sectional draft bar adapted for attachment to the stub tongue, consisting of a rigid part constructed so as to be fixedly connected to the stub tongue, and a part pivoted to the fixed part and associated therewith so as to swing vertically at its free end with respect to the fixed part and precluded from lateral movement with respect to the latter, the pivoted part being adapted for attachment at its forward end to a tractor or other draft vehicle.

2. A draft attachment comprising a part adapted for fixed attachment to a stub tongue of a vehicle so as to project forwardly therefrom, and a draft bar pivotally connected at its rear end to said part and adapted for attachment at its front end to a draft vehicle, the draft bar being slidably associated intermediate its ends with said fixed part so as to be held against lateral movement relatively thereto but capable of free swinging movement at its forward end.

3. The combination of a vehicle having a laterally swingable stub tongue, a draft attachment therefor consisting of a part detachably connectible with the stub tongue, and a draft bar pivoted to said part so as to be capable of free vertical movement at its forward end, said member being constructed to coöperate with the draft bar intermediate the ends thereof for holding the draft bar in substantially longitudinal alinement with the stub tongue.

4. A draft attachment for stub tongues, comprising a part detachably and fixedly connectible with a stub tongue, and a draft bar pivotally connected to and associated with said part in such manner as to be capable of free vertical movement at its forward end with respect to said part but precluded from lateral movement relatively thereto.

5. A draft attachment comprising a bar bent medially so as to provide upper and lower rearmost arms adapted for attachment to a vehicle, and a draft bar pivotally connected at its rear end to the lower arm and slidably associated intermediate its ends with the medial portion of said bar so as to be held in alinement therewith and so that the forward end of the draft bar, which is adapted for attachment to a vehicle, is free to swing vertically about its pivotal mounting.

6. A draft attachment of the character described comprising in combination with a stub tongue having an upwardly and forwardly inclined part, of a sectional draft bar consisting of a stationary part formed of a metal bar of general U-shape, one end of which is adapted to be secured to the forward end of the stub tongue and the other end is bent back upon itself so as to conform to the incline of said stub tongue part, a wedge block associated with said turned back end of the bar, means for clamping the wedge block in connection with the stub tongue for securing the bent end of the bar thereto, and a draft bar pivotally mounted on the lower arm of said U-shaped bar and slidably associated with the medial portion of said bar so as to be held in alinement therewith, said draft bar being adapted for attachment at its front end to a draft vehicle.

7. A sectional draft attachment of the character described comprising a generally U-shaped part, the arms of which are vertically spaced apart and adapted to be detachably connected to a stub tongue or the like, and a draft bar pivotally connected at its rear end to the lower arm, slidably associated intermediate its ends with the medial portion of the U-shaped part and held thereby in longitudinal alinement therewith, and adapted for attachment at its forward end to a draft vehicle.

8. The combination of a vehicle having a stub tongue adapted to swing laterally, a part connected to the tongue and providing a fixed upright guide surface, and a draft bar pivotally connected at its rear end in fixed relation to the stub tongue and adapted for attachment at its front end to a draft vehicle, the draft bar being associated intermediate its ends with the upright guide surface of said fixed part so as to be held thereby against lateral movement relatively to the stub tongue but capable of vertical adjustment at its forward end with respect to said tongue.

CALVIN R. DAVIS.